United States Patent
Libkind et al.

[15] 3,675,119
[45] July 4, 1972

[54] TWIN REACTOR EMPLOYED FOR VOLTAGE STABILIZATION IN POWER PLANTS

[72] Inventors: Mark Samuilovich Libkind, pereulok Stopani, 8, kv. 6, Moscow; Gurami Semenovich Lezhava, ulitsa Pavlova, 49, kv. 8, Tbilisi, both of U.S.S.R.

[22] Filed: Jan. 15, 1970
[21] Appl. No.: 3,145

[52] U.S. Cl. ......................... 323/48, 307/17, 323/89 AG, 323/89 TC, 323/89 T, 336/230
[51] Int. Cl. .................................. G05f 7/00, H01f 29/14
[58] Field of Search ............. 307/17, 83; 336/165, 211, 230; 323/6, 48, 49, 56, 57, 83, 89 AG, 89 TC, 89 C, 89 R, 92

[56] References Cited

UNITED STATES PATENTS

| | | |
|---|---|---|
| 2,809,342 | 10/1957 | Shrider et al. .................... 323/89 R |
| 3,184,675 | 5/1965 | Macklen ............................ 323/48 X |
| 3,373,347 | 3/1968 | Maka .................................. 323/89 C |
| 3,458,797 | 7/1969 | Larsen ............................... 323/48 X |

FOREIGN PATENTS OR APPLICATIONS

| | | |
|---|---|---|
| 347,538 | 0/1931 | Great Britain ..................... 323/48 |
| 206,705 | 0/1968 | U.S.S.R. ............................. 323/83 |

*Primary Examiner*—Gerald Goldberg
*Attorney*—Waters, Roditi, Schwartz & Nissen

[57] ABSTRACT

A duplex reactor having two inductively coupled working windings connected in series opposition. The windings having a common output lead connected to a power source and respective output leads connected to consumer loads. A member which controls the mutual inductance of the working windings is arranged on a magnetic core.

10 Claims, 3 Drawing Figures

TWIN REACTOR EMPLOYED FOR VOLTAGE STABILIZATION IN POWER PLANTS

The present invention relates generally to the field of supplying power to consumer loads and more particularly to devices for voltage stabilization in power plants with varying loads.

Known in the art are devices designed for voltage stabilization in power plants with varying loads, such as devices for smooth and stepped variation of transformation ratio, synchronous compensators with non-controlled reactors connected in series with an associated load, condensers series-connected with a feed line, controlled saturation reactors parallel-connected with an associated load, and the like.

However, all the above-mentioned devices suffer from the disadvantages inherent in the construction thereof which limit the field of application of said devices mostly in power plants with sharply and frequently varying loads.

The devices for smooth or stepped variation of the transformation ratio of the transformers often fail to meet the requirements for high-speed operation, the synchronous compensators with non-controlled reactors series-connected with the load require excessive expenditures for the equipment; capacitors series-connected with a feed line may involve dangerous autoparametric oscillations and facilitate current intensity increase in case of short circuits occurring in the associated electric circuits.

The employment of controlled reactors connected in parallel with an associated load is inefficient since it leads to high power requirements of the above-mentioned reactors with a resultant increased cost.

According to all the abovesaid, the employment of current-limiting, so called, duplex reactors, which are set in concrete, adapted for voltage stabilization in power plants would be useful. In this case, voltage stabilization is accomplished by simple and reliable means (duplex reactors).

However, the use of current-limiting duplex reactors, which are set in concrete, generally causes problems such as the presence of disturbing effects caused by consumer loads through the mains and, in some cases, the above-mentioned employment of current-limiting duplex reactors, which are set in concrete, may even result in an opposite effect, i.e. in increased voltage fluctuations for the loads in the case of variation of the load involved.

Apart from the abovesaid, concrete current-limiting duplex reactors which are set in concrete, suffer from increased voltage losses.

It is a primary object of the present invention to eliminate the above-mentioned disadvantages.

Another object of the present invention is to provide a constructionally simple, economical and efficient duplex reactor capable of effecting voltage stabilization in power plants subjected to varying loads as well as a reactor which can provide for the elimination of disturbing mutual effects between consumer loads.

According to the invention, said objects are accomplished by a duplex reactor which is provided with at least two inductively coupled, working windings connected in series opposition and incorporated in a magnetic core with a member adapted for controlling mutual inductance.

A common lead-out which is provided for said windings is designed for connecting the same to a supply source, whereas other leadouts are adapted for connecting said windings to corresponding consumers.

It is preferred that the member adapted for controlling mutual inductance be made with at least one a winding supplied with direct current.

It is advantageous that the magnetic core be provided with at least one non-magnetic gap on the path of the magnetic flux which is common for the working windings.

The magnetic core of the duplex reactor in contemplation may be made up by two concentrically mounted hollow cylinders made of ferromagnetic material with such an arrangement of the working windings as to provide for a rotating magnetic field and with winding supplied with direct current, said windings embracing the magnetic core partially or completely to provide for circulating superposed magnetization of the above-mentioned magnetic core.

It is likewise possible that the magnetic core with the working windings arranged thereon have a longitudinal internal passageway for the windings supplied with direct current, which provides for transverse superposed magnetization of the magnetic core.

The invention will be more apparent from a consideration of a theoretical substantiation of the operating principle of the duplex reactor according to the invention and the embodiments of the present invention described hereinbelow with due reference to the accompanying drawings, wherein.

Figure 1:
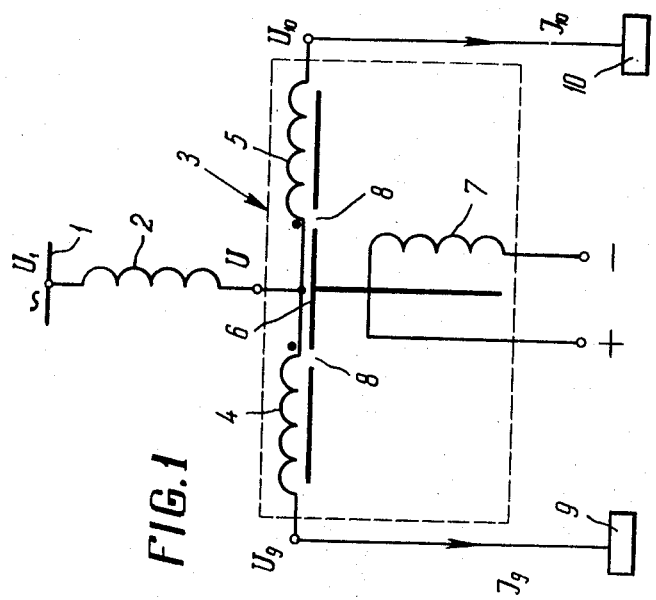
FIG. 1 represents a connection diagram of a duplex reactor according to the present invention.

As is seen from FIG. 1, a supply source 1 is connected by a line 2 represented by its inductive reactance with a duplex reactor 3. Working windings 4 and 5 of the reactor 3 are connected in series opposition and are arranged on a magnetic core 6 provided with a member for controlling mutual inductance which is essentially a winding 7 supplied with direct current.

The magnetic core 6 has nonmagnetic gaps 8. The working winding 4 is connected in series with a consumer load 9, whereas the working winding 5 is connected in series with a consumer load 10.

Disregarding the active resistances of the line and working windings of the reactor, it is possible to derive the following equations for determining voltage losses in the electric line within the section from the supply source 1 to the consumer load 9:

$$\Delta U U_1 - U_9 = I_9 \operatorname{Sin}\phi_9(x_e + x + x_{s9}) + I_{10} \operatorname{Sin}\phi_{10}(x_e - kx) \quad (I)$$

within the section from the supply source 1 up to the consumer load 10 the voltage loss is given by the following equation $$\Delta U_{10} = U_1 - U_{10} = I_{10} \operatorname{Sin}\phi_{10}(x_e + k^2 x + x_{s10}) + I_9 \operatorname{Sin}\phi_9(x_e - kx), \quad (II)$$

where $U_1$ is the voltage across the buses of the supply source;

$U_9$, $U_{10}$ are voltages across the terminals of the consumer loads 9 and 10;

$I_9$, $I_{10}$ are current intensities of the consumer load 9 and 10;

$\phi_9$, $\phi_{10}$ are the phase shifts between the current and voltage of the consumer load 9 and 10;

$x_e$ is the inductive resistance of the line 2;

$x$ is the inductive resistance of the working windings determined by virtue of the common magnetic flux passing through the working windings 4 and 5;

$x_{s4}$, $x_{s5}$ are the inductive resistances of the working windings 4 and 5 determined by virtue of the leakage fluxes thereof;

$k = \omega 4/\omega 5$ is the ratio between the turns of the working winding 4 and the turns of the working winding 5 (i.e. transformation ratio).

It is seen from Equation (I) that if $x_e = kx$ (III) the mutual effect between the consumer loads is completely eliminated.

To meet the condition (III) a certain value of the current intensity corresponding to the value of the inductive resistance $x_e$, is established in the winding 7 fed with direct current.

The constant value of the reactance $x$ with varying consumer loads 9 and 10 is accomplished by the fact that the magnetic core features nonmagnetic gaps in the magnetic circuit on the path of the magnetic flux common for both working windings.

With a view to diminishing the power consumed by the winding 7 fed with direct current, the construction of the magnetic core should be such that the above-mentioned nonmagnetic gaps are not incorporated in the magnetic circuit through which passes the magnetic flux created by the winding 7 fed with direct current.

Figure 2:
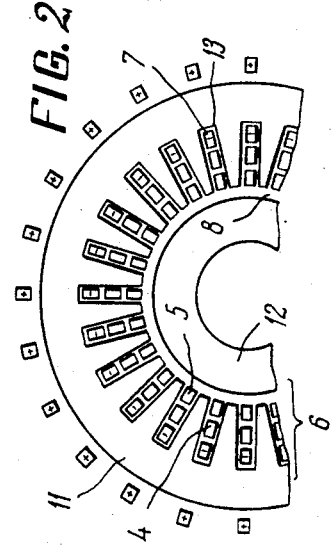
FIG. 2 represents a schematic view of a duplex reactor with a magnetic core made of two hollow cylinders manufactured from ferromagnetic materials.

One of the embodiments of the duplex reactor according to the present invention is shown in greater detail in FIG. 2. The herein above-mentioned reactor is provided with the magnetic core 6 made up by two concentrically arranged hollow cylinders, an outer cylinder 11 and inner cylinder 12, assembled of thin sheet laminations. The nonmagnetic gap 8 is provided between said cylinders.

Accommodated within slots 13 of the outer cylinder are the working windings 4 and 5 which are so arranged as to provide for the creation of a rotating magnetic field.

The winding 7 supplied with direct current partially embraces the outer cylinder so as to provide for circulating (circular) superposed magnetization.

Figure 3:
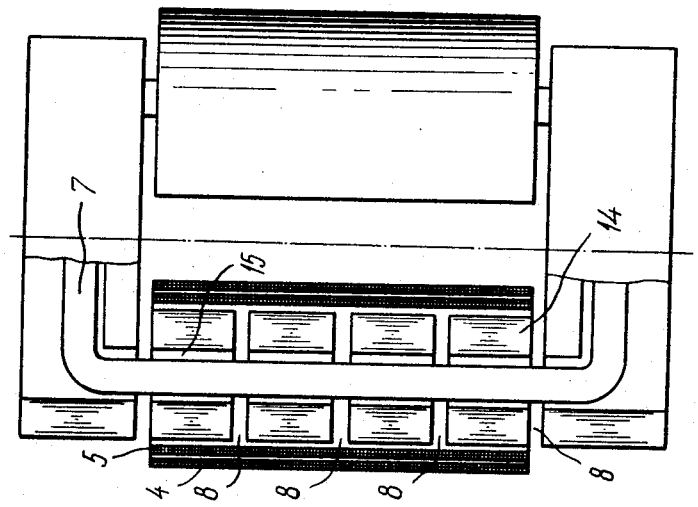
FIG. 3 represents a schematic view of a duplex reactor with a magnetic core featuring an internal longitudinal passageway.

FIG. 3 shows a second embodiment of the duplex reactor according to the present invention.

Such reactor comprises a magnetic core consisting of separate stacks 14 assembled of thin sheet laminations and separated by nonmagnetic gaps 8.

Arranged on the magnetic core are working windings 4 and 5 and inside said magnetic core provision is made for a longitudinal passageway 15 wherein the winding 7 supplied with direct current is accommodated.

Such constructions make it possible to manufacture duplex reactors for power plants rated for very high voltages such as 110 kV and above.

The duplex reactor according to the invention provides for the possibility to completely eliminate mutually disturbing effect between consumer loads, is characterized by a low installed power, is devoid of moving parts, which provides for high reliability in operation, and facilitates current intensity decrease with the occurrence of short circuits. Stabilizing characteristics of the reactor in contemplation do not depend upon the frequency and depth of variations of the loads either symmetric or asymmetric ones, and the shape of the curve of the voltage supplied from the power source remains unchanged.

What is claimed is:

1. A duplex reactor for voltage stabilization in power plants comprising: at least two inductively coupled working windings which are connected in series opposition and include a common output lead adapted for connection to a supply source and including further output leads adapted for connection to corresponding consumer loads; a single magnetic core common to said windings, and means for controlling mutual inductance of the working windings arranged on said magnetic core.

2. A duplex reactor as claimed in claim 1, wherein the means for controlling mutual inductance includes at least one winding and means to supply the latter said winding with direct current.

3. A duplex reactor as claimed in claim 1, wherein the magnetic core is provided with at least one nonmagnetic gap in the path of magnetic flux common to both working windings.

4. A duplex reactor as claimed in claim 2, wherein the magnetic core is provided with at least one non-magnetic gap in the path of magnetic flux common to both working windings.

5. A duplex reactor as claimed in claim 2, wherein the magnetic core includes two concentrically mounted hollow cylinders, the working windings being so arranged as to provide a rotating magnetic field, the windings supplied with direct current embracing the magnetic core to provide a circular superposed magnetization of at least part of the magnetic core.

6. A duplex reactor as claimed in claim 2, wherein the magnetic core consists of two concentrically mounted hollow cylinders, the working windings being so arranged as to provide a rotating magnetic field, the winding supplied with direct current embracing the magnetic core so as to provide for a circular superposed magnetization of at least part of the magnetic core.

7. A duplex reactor as claimed in claim 3, wherein the magnetic core consists of two concentrically mounted hollow cylinders, the working windings being so arranged as to provide a rotating magnetic field, the winding supplied with direct current embracing the magnetic core so as to provide for a circular superposed magnetization of at least part of the magnetic core.

8. A duplex reactor as claimed in claim 1, wherein the magnetic core with the working windings arranged thereon is provided with a longitudinal internal passageway for the winding supplied with direct current, the latter said winding providing for transverse superposed magnetization of the magnetic core.

9. A duplex reactor as claimed in claim 2, wherein the magnetic core with working windings arranged thereon is provided with a longitudinal internal passageway accommodating the winding supplied with direct current and adapted for providing longitudinal superposed magnetization of the magnetic core.

10. A duplex reactor as claimed in claim 3, wherein the magnetic core with the working windings arranged thereon is provided with a longitudinal internal passageway accommodating the winding supplied with direct current and adapted for providing transverse superposed magnetization of the magnetic core.

* * * * *